United States Patent [19]

Tsimerman

[11] Patent Number: 5,050,391
[45] Date of Patent: Sep. 24, 1991

[54] METHOD AND APPARATUS FOR GAS COOLING

[75] Inventor: Alexandre Tsimerman, Odessa, U.S.S.R.

[73] Assignee: Ari-Tec Marketing, Inc., Phoenix, Ariz.

[21] Appl. No.: 642,897

[22] Filed: Jan. 18, 1991

[51] Int. Cl.[5] ............................................. F25D 17/06
[52] U.S. Cl. ....................................... 62/94; 62/271; 62/304; 165/104.11
[58] Field of Search ................... 62/94, 271, 304, 311, 62/316, 309; 165/104.11; 261/153

[56] References Cited

U.S. PATENT DOCUMENTS

| | | | |
|---|---|---|---|
| 3,362,186 | 1/1968 | Patterson | 62/304 X |
| 3,718,008 | 2/1973 | Zusmanovich | 62/309 |
| 3,905,205 | 9/1975 | Zusmanovich | 62/309 |
| 4,156,351 | 5/1979 | Schlom et al. | 62/121 |
| 4,380,910 | 4/1983 | Hood et al. | 62/304 X |
| 4,674,295 | 6/1987 | Curtis, Sr. | 62/304 X |
| 4,713,943 | 12/1987 | Wainwright | 62/304 |
| 4,842,052 | 6/1989 | Gershuni et al. | 62/304 X |
| 4,854,129 | 8/1989 | Hickley et al. | 62/304 |
| 4,935,169 | 6/1990 | Ernst | 62/304 |
| 4,977,753 | 12/1990 | Maisotsenko et al. | 62/304 X |

Primary Examiner—Lloyd L. King
Attorney, Agent, or Firm—Gregory J. Nelson

[57] ABSTRACT

A low energy consumption apparatus and method for treating a gas in which a main gas stream is cooled and heat is transferred by convection to a liquid and a secondary gas stream across a heat transfer surface. Liquid bearing the heat evaporates into the secondary stream. A total gas stream is subjected to initial cooling along a moisture impervious surface of a heat exchange element to cause dry or sensible cooling. A secondary gas stream is diverted from the total discharge from the dry cooling stage and is directed counterflow to the total stream at the opposite surface of the heat exchange element which is an absorbent surface to cause heating and humidification of the secondary stream. The remaining cooled stream which is the primary stream is subjected to sorbent treatment to heat and dehumidify the same by flowing it through an absorbent media. The primary gas flow is then subjected to a final heat exchange treatment stage similar to the initial heat exchange treatment. Condensate may be removed from the saturated or near-saturated secondary flow. The primary flow may also be subjected to intermediate cooling treatment. A portion of the initial and final dry cooling stages preferably include an adiabatic cooling zone. The secondary flow from the initial heat exchanger may be subdivided into two streams. One secondary sub-stream is dehumidified in the sorbtion device by an auxiliary heater and is used for regeneration of the absorbent media.

21 Claims, 6 Drawing Sheets

METHOD AND APPARATUS FOR GAS COOLING

The present invention relates to a gas treatment method and more particularly to a unique method and apparatus for cooling of air and other gases utilizing evaporative cooling and sorbent dehumidification.

Conditioning of air to cool the air to create a zone of increased comfort is well known. One such method practiced in dry, hot regions such as the Southwestern United States involves direct evaporative air cooling. Direct evaporative cooling has wide application as it is quite simple requiring low energy consumption. The principle of evaporative air cooling is based on the evaporation of water to absorb the latent heat of evaporization from the air which reduces temperature and increases humidity. However, direct evaporative cooling of this type has an inherent limitation due to the fact that when the humidity of the air flow reaches saturation, the temperature and partial pressures equalize and the heat and mass exchange process ceases.

Accordingly, refrigeration devices operating on the compression cycle using a refrigerant such as Freon have become widely used. Compression cycle systems require considerable energy consumption and are expensive in initial cost and maintenance. More importantly, certain ecological problems have been attributed to compression systems for generating cool air. These systems utilize a great deal of energy and are also believed to contribute to environmental pollution. CFC molecules released to the atmosphere from compression cycle refrigeration systems may enter into photochemical reactions, reacting with the ozone layer to destroy this environmentally necessary protection.

Accordingly, due to these problems and increased environmental awareness, there has been renewed interest in evaporative cooling systems. State-of-the-art evaporative systems are capable of achieving relatively low temperatures. The term "evaporative gas cooling" as used herein refers to a type of evaporative cooling in which gas cooling occurs at one side of a dry heat transfer surface with the same type of gas undergoing heating and humidification at the opposite side of the heat exchanger surface as evaporization of a liquid occurs.

With the present evaporative method of cooling, heat and humidity transfer is realized because of the availability of two gas streams in which:

(1) The main gas stream is cooled and heat is transferred by convection to a liquid and a secondary gas stream through the heat transfer surface; and (2) Liquid bearing the heat from the main stream evaporates into the secondary gas stream.

Early work in this area was done by the present Applicant, Dr. Tsimeran, and others in the U.S.S.R. This work is disclosed in Russian Inventor's Certificate N407519 and also described in a paper entitled "Method Of Indirect Evaporative Cooling and Household Electrical Appliances" published by the Ministry For Hire and Secondary Special Education, U.S.S.R. (1977) which discloses a component utilized in the system of the present invention.

Others, apparently following the concepts described in in the above-mentioned publication, have developed various cooling methods.

U.S. Pat. No. 4,380,910 describes a multi-stage, indirect, direct evaporative cooling process and apparatus in which a supply of low-humidity ambient air is introduced into an evaporative cooler where such air is indirectly cooled without an increase in moisture content by a first re-circulating water evaporative unit in a first and second stage unit. The air is then further directly and indirectly cooled by a second re-circulating water evaporative unit in a third and fourth stage unit. In the third and fourth stages, the air which is cooled indirectly is used to cool the re-circulating water in the direct cooling phase of the evaporative unit of the fourth stage.

U.S. Pat. No. 4,854,129 discloses a method of cooling air and a cooling apparatus in which primary air is passed at least through one primary chamber to provide secondary air at an outlet chamber. Secondary air is passed in a counterflow direction through at least one secondary chamber which is in heat exchange relationship with the primary chamber.

Other patents representative of the prior art in this area are as follows:

U.S. Pat. No. 3,362,186, A. G. Patterson, 1/9/68
U.S. Pat. No. 3,718,008, L. M. Zusmanovich, 2/27/73
U.S. Pat. No. 3,905,205, L. M. Zusmanovich, 9/16/75
U.S. Pat. No. 4,156,351, L. A. Schlom, 5/29/79
U.S. Pat. No. 4,674,295, T. C. Curtis, Sr., 6/23/87
U.S. Pat. No. 4,713,943, C. E. Wainwright, 12/22/87
U.S. Pat. No. 4,842,052, Gershuni et al, 6/27/89
U.S. Pat. No. 4,935,169, G. Ernst, 6/19/80
JP 57-74582, May, 1982
USSR 553402, April, 1977
USSR 335509, 12/12/72

With the prior art systems listed above, the final conditions of the air are limited by the dew point temperature of the ambient air. The dry bulb temperature of the air discharged from these systems will approach but cannot reach the dew point temperature of the initial air.

The principal object of the present invention is to provide an improved gas cooling system which will achieve final gas or air temperatures significantly lower than the dew point of the input air.

Another object is to provide a gas cooling system which is economical in energy consumption.

A further object is the provision of such an apparatus and system which operates on a principle of evaporation of different liquids into a pre-dried gas stream, the liquids having a low partial vapor pressure.

Briefly, the method and apparatus of the present invention is used for cooling a gas, such as air. The term "air" will be used for simplicity throughout, it being appreciated that other gases such as hydrogen, nitrogen, and CO2 may also be treated by the present invention. Any two-atom gas or mixtures of such gases may be treated in accordance with the invention.

An initial total stream of moistened air is first introduced into a precooling zone by an air mover. The pre-cooling zone defines a chamber subdivided by a heat exchange element into a primary chamber and a secondary chamber. The heat exchange element is specially constructed having a moisture-impervious surface or barrier exposed to the primary chamber and a liquid absorbant surface exposed to the secondary chamber. The total air stream to be treated flows through the primary chamber where dry cooling occurs which may also be termed "sensible cooling". A portion of the total stream is diverted creating a primary and a secondary air stream. The secondary stream is directed countercurrently through the secondary chamber of the initial heat exchanger. In the secondary chamber, the moving air is humidified and heated causing heat to be extracted from the total air flow in the primary chamber across the heat exchange element. The primary air flow is then directed to a sorbent zone where the primary stream air is heated and dried to a lower absolute humidity. "Sorbent" or "sorbtion" is used herein to describe a zone or condition where liquid is removed from the gas or air stream and heating occurs. The regeneration energy for the sorbtion stage may be from external heat source and the heated air from the secondary stream may be used to accomplish desorbtion or regeneration of the saturated adsorbent material.

In the sorbtion stage, the temperature of the primary stream is increased and the absolute humidity decreased preferably through contact with a continually regenerated adsorptive media. Thereafter, the primary stream is directed to a final dry cooling stage, again having a heat transfer element with a liquid impervious surface exposed to a dry cooling chamber and a liquid absorbent surface exposed to a heating and humidification chamber. The primary stream flows through the dry cooling chamber along the impervious heat exchange surface and further cooling occurs. A portion of the primary finally-treated air stream is directed counter-currently through the final heat exchanger along the liquid absorbent surface of the heat exchanger element. One or more intermediate dry cooling stages may be interposed between the sorbtion stage and the final cooling stage. A portion of the dry cooling zones of the initial and final heat exchanger stages may include zones of adiabatic cooling.

The secondary air stream from the final cooling or intermediate cooling stage, may be directed to one side of a condenser with the secondary air stream from the initial dry evaporative precooling stage directed to the other side of the condenser at which point pure condensate may be extracted. In various system configurations, heated air may be withdrawn from the secondary air stream at various locations within the system.

Typically, if the total air stream entering the system is approximately 115° F. with 25% relative humidity, the final temperature will be lowered to approximately 40° F. with a relative humidity of 70%.

The present invention will be better understood from the following description, claims and drawings in which:

Figure 1:
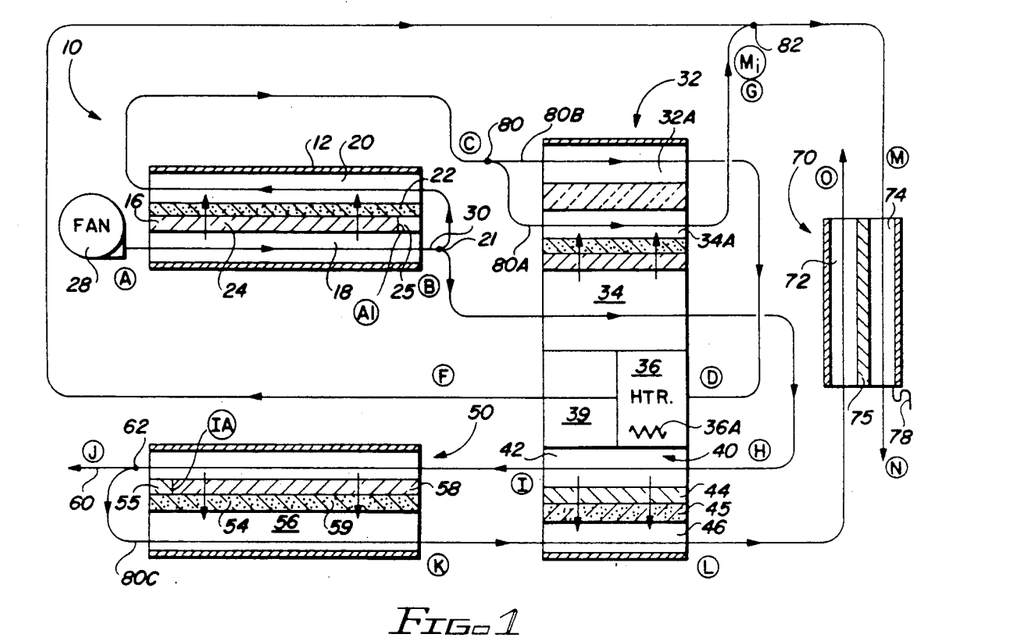
FIG. 1 is a schematic flow chart illustrating the process and apparatus of the present invention.
Figure 2:
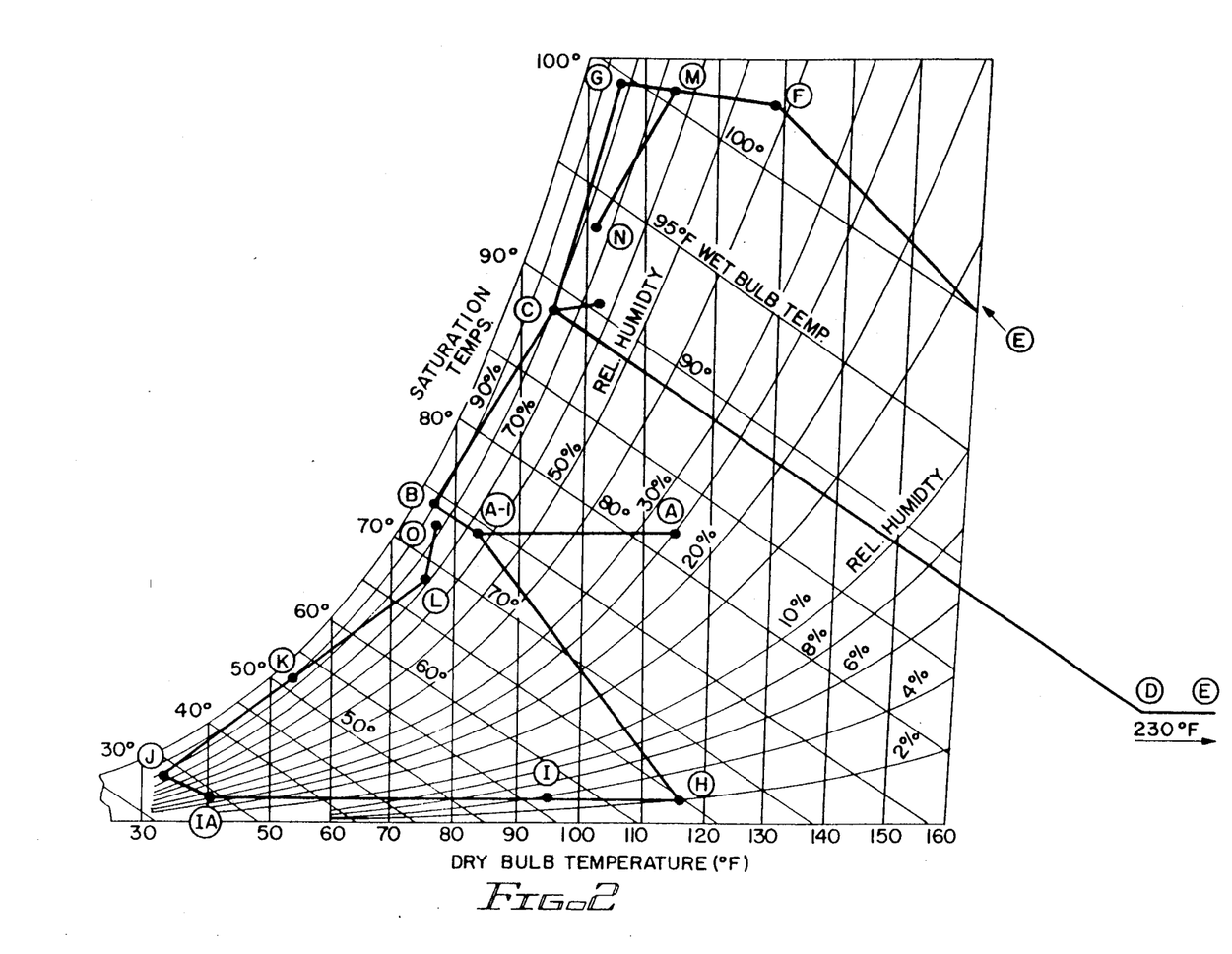
FIG. 2 is a psychrometric chart illustrating the stages of the process shown in FIG. 1.
Figure 7:
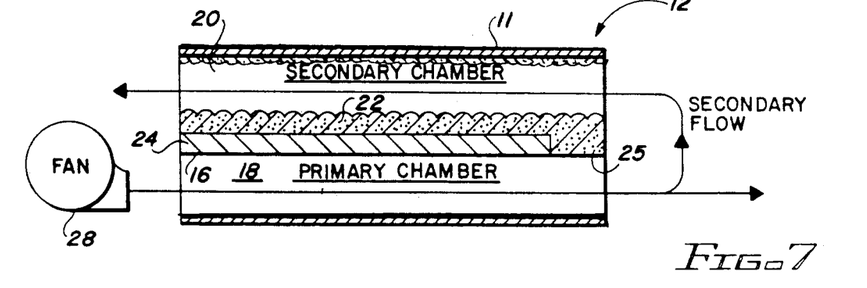
FIG. 7 is a cross-sectional view illustrating a heat exchanger and the heat transfer element of the type which may be used for initial and final treatment.

Turning now to the drawings, particularly FIGS. 1, 2 and 7, a preferred form of the invention is shown generally designated by the numeral 10 having an initial stage heat exchanger 12 to achieve precooling of the total air stream being processed. Heat exchanger 12 has a housing 11 and is divided by a longitudinally extending heat exchange element 16 into a primary chamber 18 and a secondary chamber 20. Housing 11 may be constructed of any suitable material and may be any suitable shape such as rectilinear or cylindrical.

Heat exchanger 12 is shown in detail in FIG. 7 and includes a liquid absorbent surface 22 which is exposed to the secondary chamber 20. Surface 22 is hydrophobic and is porous. A nonporous, moisture-impervious barrier or film 24 extends substantially the entire length of the heat exchanger at the side of the element exposed to the primary treatment chamber 18. Preferably the heat exchange element 24 is very thin having good heat transfer characteristics. Both the porous and nonporous materials may be a plastic such as PVC. Porous PVC material suitable for this purposes is available under the designation "Miplast" which is manufactured by the company UNGFER of Austria. The nonporous or impervious material may be a thin film of PVC laminated to the porous PVC or may be material such as a metal foil laminated to porous PVC substrate. Preferably element 24 extends substantially the entire length of the heat exchanger 12 terminating a short distance from the outlet of chamber 18 leaving an area or zone 25 in which the porous material 22 is exposed to the primary heat exchange chamber 18. The total air flow, which typically is ambient air, is introduced into the primary chamber 18 under the influence of an air mover or fan 28. Ambient air is indicated at point A in FIGS. 1 and 2. The total air flow exits the heat exchanger at outlet 30 and a portion of the total flow is diverted at 21 and directed to the secondary chamber 20 in a direction countercurrent to the flow through the primary chamber establishing a secondary air flow. The remaining portion of the total flow is designated as the primary flow.

As the total air stream flows through primary chamber 18, it is cooled by convection as heat is extracted from the total air flow across the heat exchange element 16. Concurrently, the secondary air flow moving in the opposite direction through the secondary chamber 20 is exposed to the absorbent surface 22 of the heat exchanger element causing the secondary air stream to be heated and humidified as liquid is evaporated into the secondary stream. Continuing to follow the path of the total air stream, the changing conditions through the primary heat exchanger chamber are indicated by lines A-A1 and A1-B on psychrometric chart FIG. 2. Note that the representations on the accompanying psychrometric charts assume ideal conditions and some variation in actual practice may be expected. Throughout the schematic drawings, the various conditions at various process locations are indicated by letters (i.e. A , B, etc.) and the corresponding points are similarly indicated on the respective accompanying psychrometric charts.

A portion of the primary chamber 18 preceding the outlet 30 is exposed to the porous or absorbent material at zone 25. Dry or sensible cooling occurs to point A1. Adiabatic cooling of the total air flow occurs from A1 to B due to the moisture present in zone 25. The adiabatic cooling zone 25 comprises only a relatively short portion of the entire length of the cooling chamber 18.

The primary air stream exiting the primary chamber, which represents a portion of the total air stream, is introduced into a sorbtion device 32 having a main sorbtion zone 34, a primary air cooling zone 34A, a secondary sorbtion zone 32A, and regeneration zone 36. Heating and dehumidification of the primary air stream occurs in the sorbtion zone 34. Regenerative heat may be obtained by heating a portion of the secondary stream with auxiliary heat in the zone 36. Line B-H represents the change of conditions of the primary air stream as it passes through zone 34.

Before entering the sorbtion unit 32, the secondary air is divided at point 80 (See FIG. 1) into two flows 80A and 80B. Portion 80A of the secondary air is used to extract heat from the primary air in sorbtion zone 34. The secondary air 80A is heated and humidified in zone 34A. This process is indicated on a psychrometric chart by line C-G and will be explained in greater detail with respect to FIG. 9.

Portion 80B of the secondary air enters the sorbtion zone 32A where it is heated and dehumidified. This process is indicated on the psychrometric chart of FIG. 2 by line C-D. After the portion of the secondary air designated 80B exits sorbtion zone 32A it enters a heating zone 36 where it is heated by heater 36A which may be energized by a convenient source. The heated air then enters a desorbtion zone 39 where cooling and humidification of the primary air takes place. These processes are indicated on a psychrometric chart by lines D-E (Heating) and E-F (Desorbtion).

Figure 9:
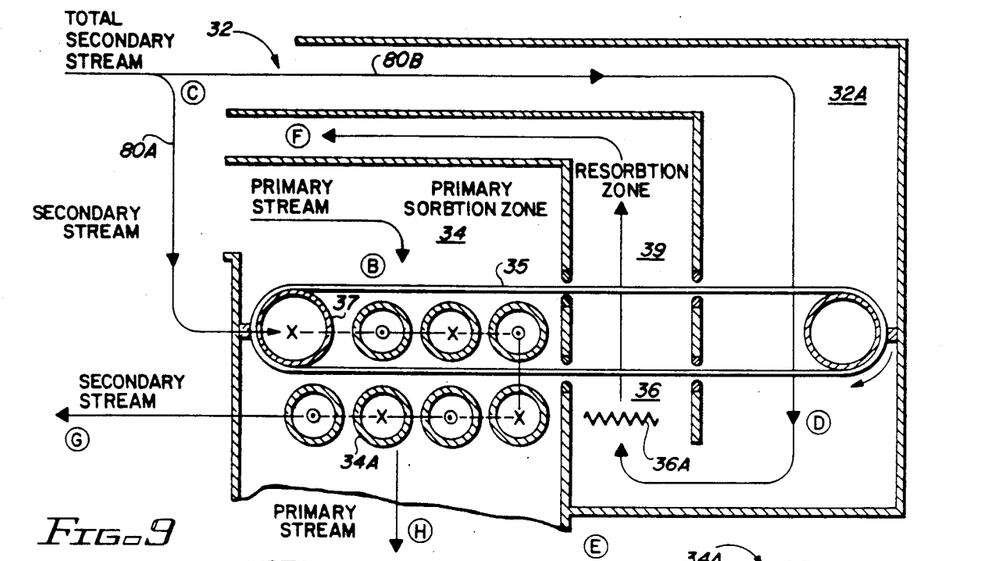
FIG. 9 illustrates a representative configuration of the adsorption/desorbtion apparatus.

The details of a typical sorbtion device 32 are shown in FIG. 9 which has three adjacent air chambers defining zones 34, 39 and 32A. A belt 35 of adsorbent, flexible material is supported at opposite ends by rollers 37 at least one of which is a drive roller. The belt 35 moves continuously in direction as shown by the arrows in FIG. 9 through adjacent chambers 34, 36 and 32A. The primary stream of air (at conditions B on the psychrometric chart, FIG. 2) enters chamber 34 where the air contacts the dry part of the adsorbent moving belt which dries the air and also increases its temperature.

Figures 10, 11:
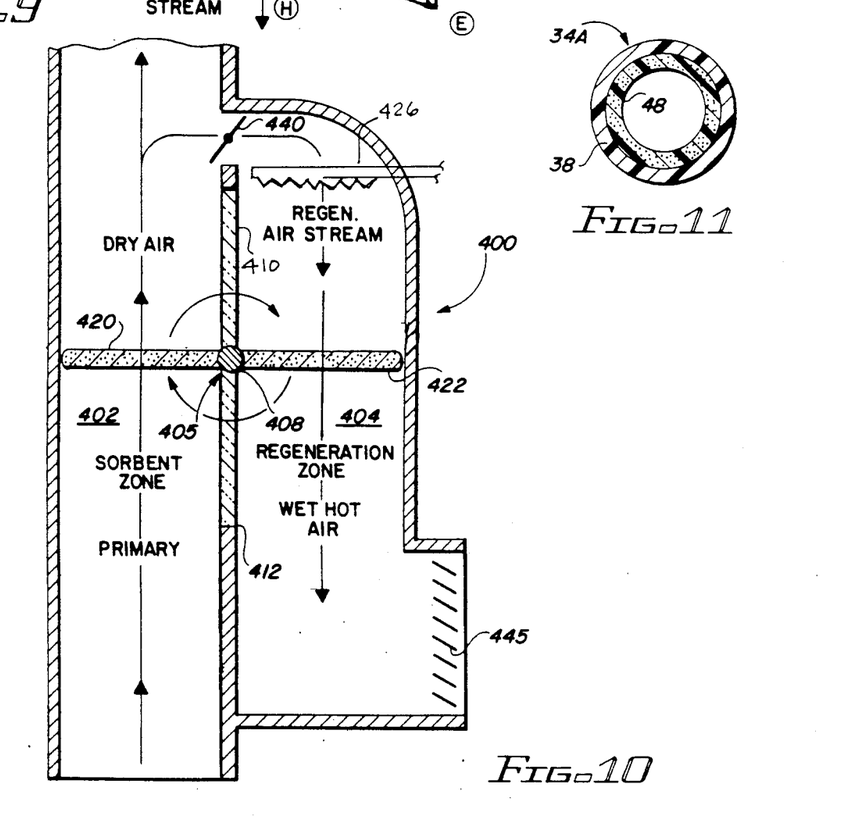
FIG. 10 is a cross-sectional view of an alternative construction for the sorbtion and regeneration apparatus.
FIG. 11 is a cross-sectional view of heat exchange elements shown in FIG. 9.

A heat exchanger 34A is installed in the first adsorption zone 34. The heat exchanger has a number of tubular heat transfer elements 38 as shown in FIG. 11. The heat transfer element 38 consists of a solid, thin tube internally coated with a porous PVC 48 or other similar material as shown in detail in FIG. 11. A cooling media is directed internally through heat exchanger element 38 which comprises the portion of the secondary air stream 80A which evaporates liquid from the wetted porous surface of the heat transfer elements 38 and extracts some heat from the primary air stream becoming moistened and heated in the process. Subsequently, the secondary air stream portion 80A exits heat exchanger 34A at conditions indicated as "G". The primary air exits zone 34 at conditions "H".

The adsorbent moisture-impregnated belt 35 moves from the primary sorbtion zone 34 into desorbtion zone 39. The secondary air stream portion 80B from the second adsorbtion chamber 32A also enters into desorbtion zone 39 and after being heated by the auxiliary heater 36A contacts the moisture-impregnated belt 35 and removes some of the adsorbed liquid from the belt. The secondary air stream exits the desorbtion zone at the conditions indicated by letter "F" on the psychrometric chart FIG. 2. The adsorbent moisture-impregnated belt exits the desorbtion chamber 39 and enters the second adsorbtion chamber 32A where it contacts the secondary air stream 80B which results in some further air drying and heating due to the adsorbtion process. The secondary air stream then exits second adsorbtion chamber 32A and enters desorbtion chamber 39 as has been previously described after first being heated and then contacted with belt 35.

The conditions of the secondary air stream entering and exiting the second adsorbtion chamber 32A are indicated respectively by letters "C" and "D" on the psychrometric chart.

Portion 80B of the secondary heated moist air from the heating or regeneration zone 36 is discharged as is indicated at point F and is combined at point 82 with the secondary flow 80A at the conditions indicated as point G from heat exchange chamber 34A of the sorbtion device 32.

Referring to FIG. 1, the heated dry primary air stream exiting zone 34 of sorbtion unit 32 is directed to intermediate heat exchanger 40. Cooling zone 42 is located at one side of heat exchange element 44 of heat exchanger 40. Heat exchanger 40 is generally constructed as has been described above with reference to unit 12 with the exception that heat exchanger 40 does not include an adiabatic cooling zone as provided in unit 12. The opposite side of heat exchanger element 44 has a liquid absorbent surface 45 which is exposed to heating chamber 46 located on the opposite side of the element 44. The primary air stream passes through the dry cooling zone 42 and heat is extracted from the air to cause heating and humidification of the secondary air flow in the adjacent heating zone 46. Line HI on the psychrometric chart FIG. 2 represents the passage of the primary air flow through the dry cooling zone 42. The air exiting the dry cooling zone 42 is then subjected to a final dry evaporative cooling in final heat exchanger unit 50.

Final heat exchanger unit 50 is divided by a longitudinally extending heat exhcnager element 54 into dry cooling chamber 51 and opposed heating chamber 56. Heat exchanger element 54 has a moisture impervious, nonporous surface 58 which extends substantially the entire length of the unit leaving adiabatic zone 55 adjacent outlet 60. The opposite heat exchange surface and comprises a porous or liquid-absorbent material 59 as has been previously described which material is exposed to chamber 51 in zone 55 immediately preceding the outlet. The primary air exits the heat exchange unit at 60 and may be directed to a space to be conditioned. Dry cooling occurs from I to IA. In zone 55 adiabatic cooling occurs as indicated by line IA - J which represents the change of conditions occurring through zone 55 of the evaporative cooling unit.

A predetermined volume of the primary air identified as secondary air portion 80C is discharged from the final heat exchanger and is redirected at point 62 through chamber 56 adjacent the absorbent side 59 of the heat exchange element counterflow to the flow through chamber 51. Humidification and heating of the secondary air portion 80C occurs in chamber 56 which is represented by line J-K on the psychrometric chart FIG. 2. Additional heating and humidification of portion 80C occurs in heating zone 46 of unit 40 and is represented by line KL on the psychrometric chart. The heated, humidified secondary air stream portion 80C is then directed to condenser unit 70. A heat exchange element 75 extends longitudinally dividing the condenser unit 70 into adjacent chambers 72 and 74. The hot, nearly saturated secondary air flow, portions 80A and 80B from the initial heat exchanger 12 and the sorbent unit 32 which have been combined at 82 are cooled in zone 74 of condenser unit 70. This process is shown by line M-N. The process is also effective to produce a pure liquid condensate which is removed at 78.

Figure 3:
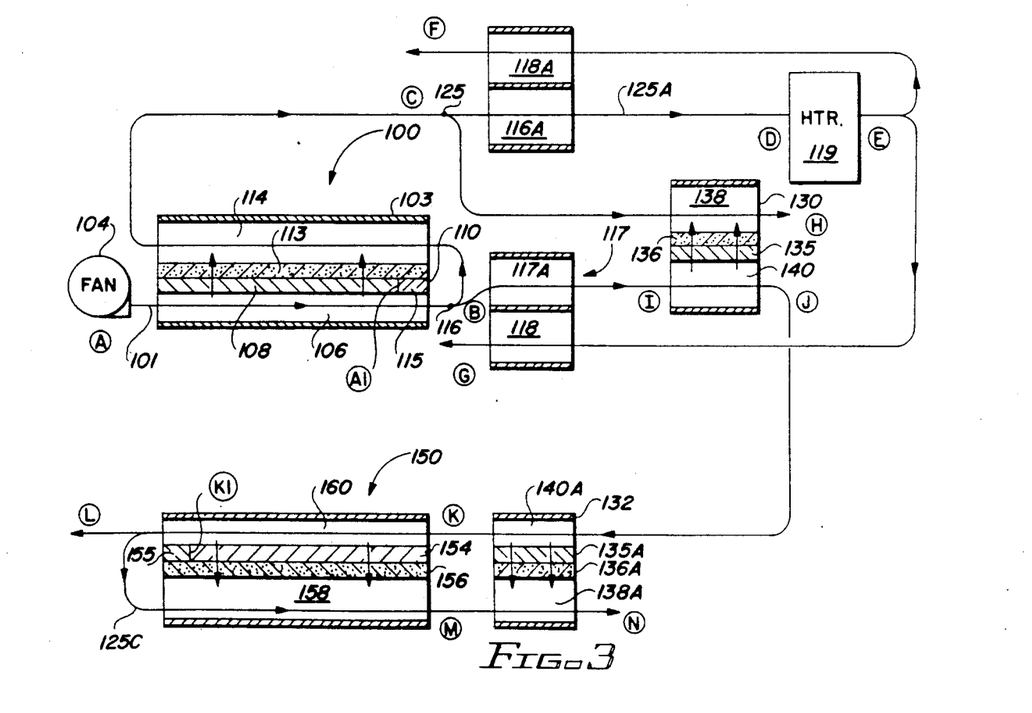
FIG. 3 is a schematic flow chart of an alternate embodiment of the system of the present invention.
Figure 4:
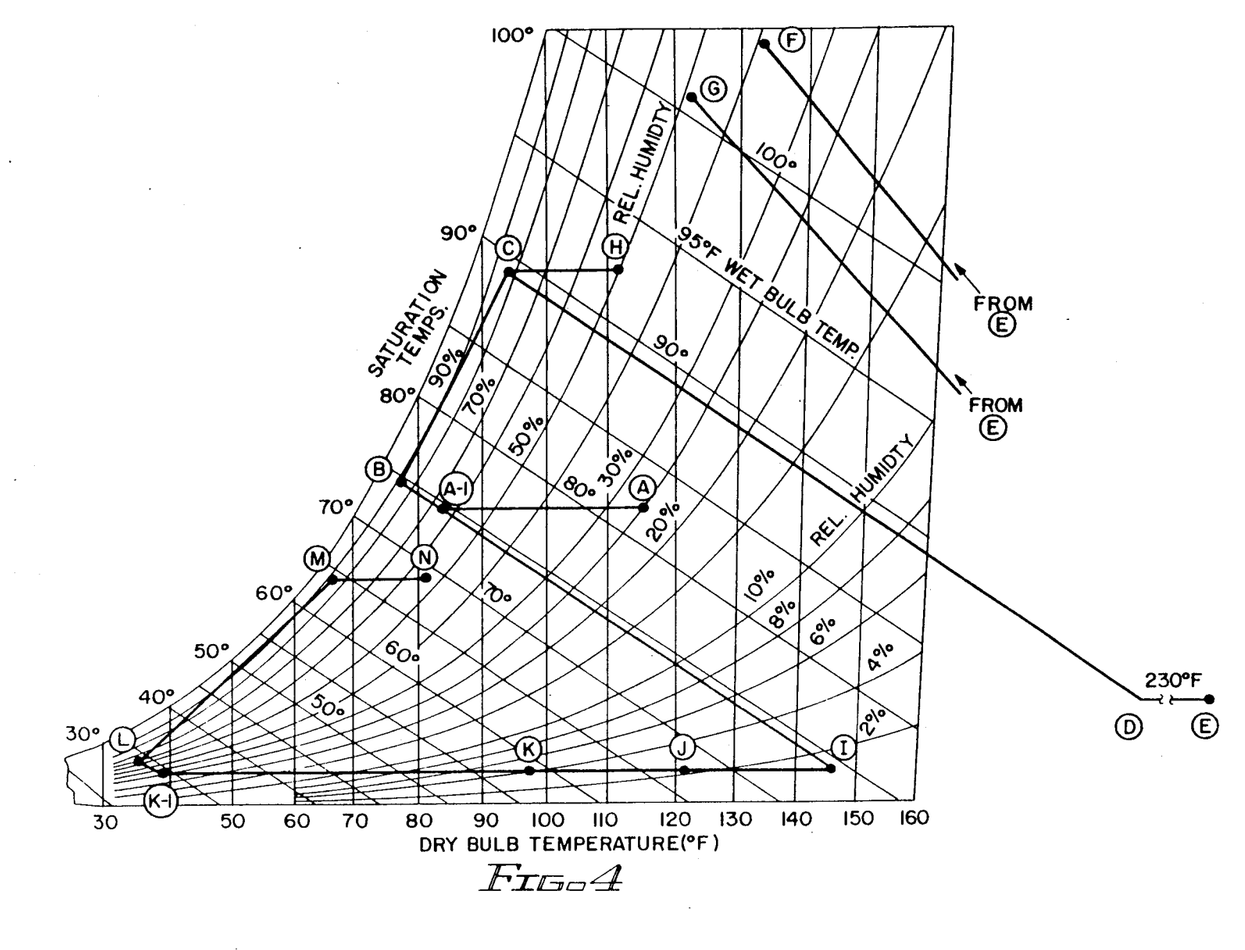
FIG. 4 is a psychrometric chart illustrating the process carried out by the system of FIG. 3.

FIGS. 3 and 4 illustrate an alternate embodiment of the present invention. The modification of the process shown with reference to these figures has the advantage of being simpler in construction although comparatively lower efficiency or performance may be exhibited as compared to that shown in FIGS. 1 and 2. Unlike the basic process described above with reference to FIGS. 1 and 2, the entire primary air main stream is subjected to a sorbtion process and the entire secondary stream utilizes the main stream for cooling which may take place either in an absorber or in an auxiliary heat exchanger. With the process of this embodiment, available regeneration heat is slightly higher. The utilization of a single absorber results in simplification of the design of the system.

With the system as shown in FIGS. 3 and 4, the total air flow is introduced into the inlet 101 of initial heat exchange unit 100 under influence of air mover 104 which creates a positive air flow in the system. It is to be noted that one of the advantages available with all embodiments of the present invention is that only a single air mover is necessary and the system does not require expensive or complex compressors or the like. Air moving through dry cooling chamber 106 of heat exchanger 100 undergoes an initial dry precooling. The initial heat exchanger 100 is constructed generally as has been described with reference to unit 12 of FIG. 1 having a housing 103 having a longitudinally extending heat exchange element 110 with a moisture-impervious surface 108 extending substantially the length of chamber 106. The opposite surface 113 of the element 110 consists of a liquid absorbent material exposed to chamber 114. Surface 108 extends substantially the entire length of the heat exchanger chamber 106 terminating a short distance from the outlet 112 exposing the absorbent material 108 to the end of chamber 106 at adiabatic cooling zone 115. As the air moves through chamber 106 it is subjected to dry cooling along surface 108 and adiabatic cooling at zone 115. Points A, A1 and B of FIGS. 3 and 4 represent the conditions at the inlet, zone 115 and outlet, respectively.

At the outlet of the initial heat exchanger, a portion of the total air flow is diverted into a main stream and a secondary stream at point 116. The secondary stream is directed through chamber 114 in a direction counterflow to the primary flow to extract heat from the primary air stream in chamber 106 as moisture bearing the heat is evaporated into the secondary stream. After passage through the initial heat exchange unit 100, the secondary stream is split at point 125 into two streams 125A and 125B.

The primary flow exiting the initial heat exchanger is directed to sorbtion device 117 where heating and drying of the primary air flow occurs in sorbtion chamber 117A. Dry, hot secondary air is introduced into the adjacent chamber 118 of the sorbtion device 117 from a source such as heater 119 to indirectly cool the primary air by passing through or across a heat exchanger element as seen in FIG. 11. In sorbtion zone 117A, the main air stream is heated and substantially reduced in moisture content. This is represented by line BI on the psychrometric chart FIG. 4.

Secondary air stream 125A flows through adsorbtion zone 116A which is equivalent to zone 32A described above. Airflow 125A is heated by heater 119 and directed to either desorbtion zones 118 and 118A where regeneration of a moisture-removing media occurs. Zones 118 and 118A are the functional equivalent to zone 39 described with reference to FIG. 9. The zones 117A, 118, 116A and 118A may be of various construction and reference is made to FIG. 9 for a representative construction.

The primary air exiting sorbtion zone 117A is subjected to intermediate cooling in heat exchange units 130 and 132. Heat exchange units 130 and 132 are similar and each is constructed similar to the initial heat exchanger each having a longitudinally extending liquid impervious heat surface 135, 135A, respectively, as has been described before. An absorbent surface 136 is exposed to chamber 138 in heat exchanger 130. Similarly, the absorbent surface 136A is exposed to chamber 138A in heat exchanger 132. Thus, heat is extracted from the primary air stream flowing through dry cooling chambers 140 and 140A. The counterflow stream of secondary air through chambers 138 and 138A is heated and humidified as moisture is evaporated into the secondary stream. The impervious heat exchange surfaces 135, 135A each extend the entire length of their respective units so dry cooling occurs throughout the cooling chambers of the units.

Lines I-J and J-K on the psychrometric chart of FIG. 4 represent the change of conditions of the primary stream occurring in the intermediate heat exchangers and the secondary streams are represented at lines CH and JK.

Final stage of dry cooling of the primary air stream takes place in the final heat exchanger 150. The final heat exchanger 150 is constructed similar to the initial heat exchanger having a housing containing a longitudinally extending heat exchange element having a liquid impervious surface 154 and an opposite absorbent surface 156. The element divides the chamber into cooling chamber 160 and opposite heating and humidification zone 158. Preferably, the surface 154 terminates within chamber 158 exposing a portion of the dry cooling chamber 158 to the absorbent material for humidification at zone 155 in the chamber.

The primary flow is directed through dry cooling chamber 160 where heat is extracted across the heat exchange element 152. A portion of the primary air stream discharged from the cooling zone 160, defined as secondary stream portion 125C, is re-directed through the humidification and heating chamber 158 to extract heat from the primary air flow. The heated air exiting the humidification and heating chamber 158 is directed to chamber 138A of intermediate heat exchanger 132.

The treatment of the main stream in cooling zones 160 is represented by lines K-K1 and K1-L on the psychrometric chart of FIG. 4. The condition of the counterflow secondary stream 125C is represented by LM through zone 158 and MN through zone 138A. In the embodiment described above, some continuous supply of make-up water may be required which generally will be added to the wet chambers of 114, 138A, 158 and 138 of the respective heat exchanger units.

Figure 5:
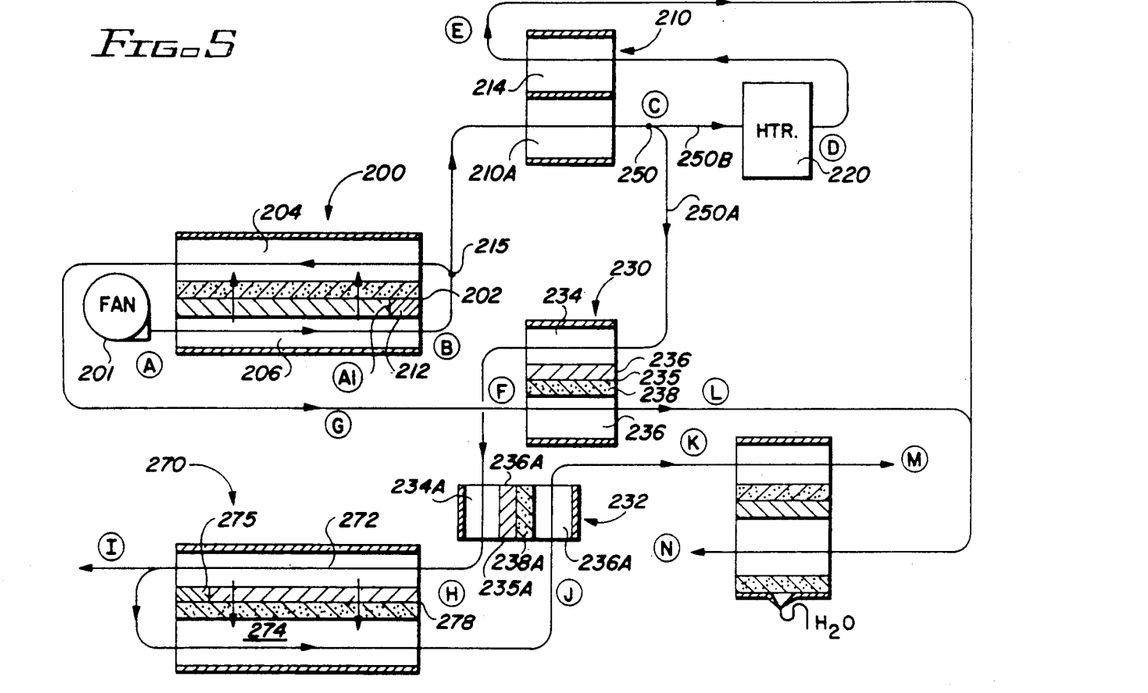
FIG. 5 is a schematic flow chart still of another embodiment of the system of the present invention.
Figure 6:
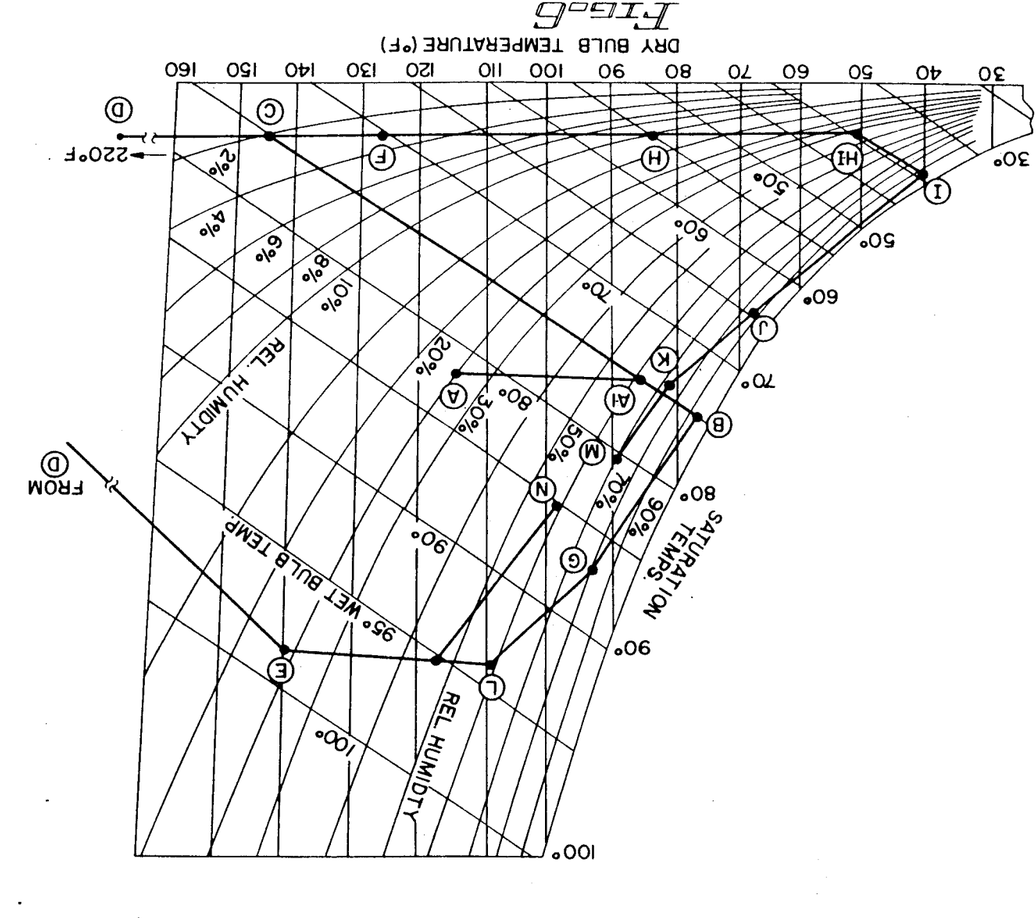
FIG. 6 is a psychrometric chart illustraring the process carried out by the system of FIG. 5.

Still another embodiment of the present invention is shown in schematic form in FIG. 5 and the process carried out therein is represented on the associated psychrometric chart FIG. 6. In the process of this embodiment the entire primary gas stream is subjected to a sorbtion process and the entire secondary stream is utilized for cooling the main stream which takes place in heat exchangers 230 and 232. With this variation, the amount of regenerative heat available is slightly greater and the system may either be an open or closed loop system.

Turning now to a consideration of FIGS. 5 and 6, the system shown minimizes the amount of equipment required. Some outside heat will be required for regeneration in the system of this embodiment. A total air stream typically at a temperature of 115° F. and having a relative humidity of approximately 25% is introduced into the initial heat exchanger unit 200 by air mover unit 201. Heat exchanger 200 is divided by a heat exchange element 202 as described above into adjacent chambers 204 and 206. The total air flow is pre-cooled in chamber 206 as it flows along the moisture-impervious side of element 202. A portion of the total stream is split off at 215 as a secondary air stream which is counter-currently directed through chamber 204 at the opposite side of the heat exchange barrier along the absorbent surface 205 of the heat exchange element. An adiabatic cooling zone 212 is established adjacent the discharge end of the heat exchanger. The total stream treatment through the heat exchanber 200 is represented by lines A-A1 and A1-B on the psychrometric chart of FIG. 6.

The stream of primary air continues to flow through the sorbtion zone 210A of the sorbtion unit 210. In the sorbtion zone the primary air is heated and dried as indicated by line BC on the psychrometric chart, FIG. 6. The sorbtion unit 210 is as described above having an adjacent regeneration zone 214 which receives heated air from heater 220. After treatment in the sorbtion unit 210, the primary air stream splits at point 250 into two portions 250A and 250B. The sorbtion unit may be of various configurations and as an example may comprise an endless belt of flexible, absorbent media moveable between the zones 210A and 214 as has been described with reference to FIG. 9.

The primary air stream portion 250A is then directed through intermediate dry cooling units 230 and 232 where dry cooling occurs. These units each have a heat exchange element 235, 235A with a moisture-impervious surface 236, 236A and an opposite absorbent surface 238, 238A on the opposite side, respectively. The heat exchange elements define dry cooling zones 234, 234A and heating and humidification zones 236, 236A, respectively.

Portion 250B of the primary flow is directed to auxiliary heating unit 220 which generates heat using any convenient energy source. The heated primary air portion 250B exiting heater 220 is directed to regeneration zone 214. See lines CD and DE of FIG. 6. The air exiting the regeneration section 214 of the sorbtion unit 210 is combined with the entire secondary flow from chamber 204 of the initial heat exchanger and is directed to condenser chamber 260 of condenser unit 262.

Final cooling or sensible cooling of the primary air flow occurs in final heat exchanger unit 270 which again has a dry cooling chamber 272 and a heating and humidification chamber 274 established by element 278 which is constructed having a moisture impervious element and an opposite porous element. Adiabatic cooling zone 275 is located adjacent the discharge from chamber 272. A portion of the primary flow exiting the final cooling stage is directed counterflow through chamber 274 where it is heated and humidified and is directed through chamber 236A of intermediate heat exchanger 232. The air flow is then directed to the chamber 264 of condenser unit 262. The various treatment stages are represented on the psychrometric chart and the flow chart by letters.

The following is a summary of typical conditions that will occur at the various stages in the above three embodiments or options. In each case, starting conditions are assumed to be ambient air at approximately 115° F. and 25% relative humidity.

REPRESENTATIVE PROCESS CONDITIONS

Main Stream Flow

| FIG. 1 | | |
|---|---|---|
| Point on Psychrometric Chart | Temperature | Relative Humidity |
| Ambient @ Inlet (A) | 115° F. | 25% |
| Exit 1st H.E. (B) | 77° F. | 90% |
| Exit Sorbtion Zone (H) | 117° F. | 2% |
| Exit Dry Cool Zone (I) | 95° F. | 4% |
| Final Treated Air (J) | 35° F. | 35% |

| FIG. 3 | | |
|---|---|---|
| Point on Psychrometric Chart | Temperature | Relative Humidity |
| Ambient @ Inlet (A) | 115° F. | 25% |
| Exit Initial H.E. (B) | 77° F. | 90% |
| Exit Sorbtion Zone (I) | 145° F. | 1% |
| Exit 1st Intermediate H.E. (J) | 122° F. | 2% |
| Exit 2nd Intermediate H.E. (K) | 97° F. | 4% |
| Final Treated Air (L) | 33° F. | 55% |

| FIG. 5 | | |
|---|---|---|
| Point on Psychrometric Chart | Temperature | Relative Humidity |
| Ambient @ Inlet (A) | 115° F. | 25% |
| Exit Initial H.E. (B) | 77° F. | 90% |
| Exit Sorbtion Zone (C) | 145° F. | 2% |
| Exit 1st Intermediate H.E. (F) | 125° F. | 3% |
| Exit 2nd Intermediate H.E. (H) | 85° F. | 10% |
| Final Treated Air (I) | 41° F. | 90% |

Figure 8:
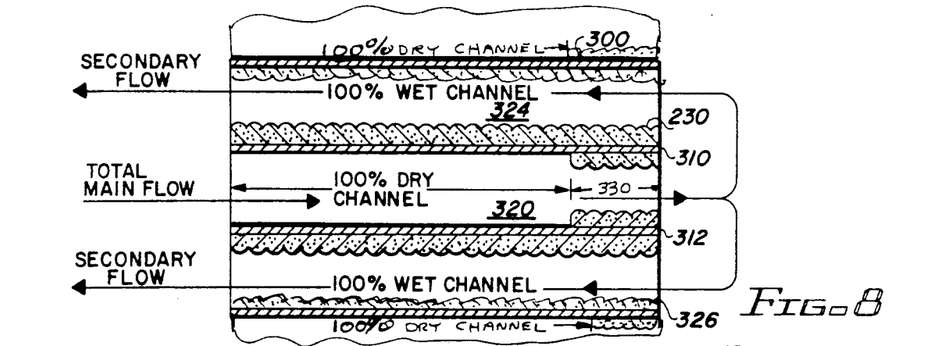
FIG. 8 illustrates a section of an alternate construction heat exchanger.

The construction of the initial and final heat exchanger have been described above and are essentially the same. Other constructions can be utilized in the overall system. FIG. 8 shows a variation in which the heat exchanger has an external housing 300 containing a pair of spaced-apart heat exchanger elements 310 and 312. The heat exchanger elements define a central passage 320 in which dry cooling occurs. The outer passages 324 and 326 receive the secondary stream which is heated and humidified due to the exposure to the wetted absorbent surface 230. The central dry cooling channel is defined by the moisture-impervious surfaces of the heat exchange elements. An adiabatic zone 330 exits adjacent the discharge end of the central channel.

An alternate arrangement for the sorbent unit is shown in FIG. 10. In the sorbent unit, the primary stream is dried and the secondary stream used for regeneration of the absorptive media. The sorbent unit of FIG. 10 is generally designated by the numeral 400 having a sorbent zone 402 and a regenerative zone 404. A rotor 405 is mounted on an axle 408 which is motorized. The rotor has solid plates 410 normally extending in opening 412 to separate the zones 402 and 404. Porous, adsorbent elements 420 and 422 extend transversely into the zones from the axle. A heater 426 directs heat onto the element 422 in the regeneration zone.

The primary air will be dried as it passes across element 420 as the element 420 absorbs moisture from the air flow. When element 420 becomes saturated, the rotor 405 is activated to rotate element 420 into position in the regeneration zone. The now-saturated element 422 is dried in the regeneration zone by heater 426. The process continues as necessary with appropriate monitoring equipment measuring such parameters as temperature and humidity controlling the regenerative cycling of the absorbent elements. The hot, wet stream is discharged at 445.

The various system variations are representative as are the process representations on the accompanying psychrometric charts. The initial ambient conditions will influence performance as will adjustments to air flow throughout.

Although the preferred form of the system utilizes an initial heat exchanger in which dry cooling of the total air occurs, in some environments this stage may be omitted. The outside air would then be first subjected to drying in a sorbent zone and finally cooling in a final heat exchanger of the type such as that designated by numeral 10 in FIG. 1. The regenerative stream from the drying media may be the counterflow secondary stream from the heat exchanger which is heated by an auxilliary heater. Alternatively, under some conditions, the ambient air input can be split with a portion used as the secondary flow through the sorbtion unit of the type shown in FIG. 9A.

It will be obvious to those skilled in the art to make various changes, alterations and modifications to the method and apparatus for gas cooling described herein. To the extent such changes, alterations and modifications do not depart from the spirit and scope of the appended claims, they are intended to be encompassed therein.

I claim:

1. A process for treating a total stream of gas to condition the same comprising:
   (a) treating the total gas stream in initial heat exchange zone by flowing the total gas along a first moisture-impervious surface to extract heat at substantially constant moisture conditions to produce a dry cooled gas in a first stage;
   (b) diverting a portion of the total stream of dry cooled gas to establish a secondary gas flow and a primary gas flow;
   (c) directing the secondary gas flow in a secondary heat exchange zone counter-currently to the total gas stream along an absorbent surface adjacent said first moisture-impervious surface in heat exchange relationship with said total flow to heat and humidify said secondary gas flow;
   (d) directing the primary stream of dry cooled gas through a sorbent zone to heat and dehumidify same in a second stage treatment;
   (e) directing the heated dehumidified primary gas flow from said sorbent zone to a dry cooling chamber in a final heat exchange zone along a moisture impervious surface to extract heat therefrom to cause dry cooling at substantially constant moisture conditions to produce a dry cooled gas; and
   (f) diverting a portion of the gas exiting the final heat exchanger and directing it countercurrently to the flow in the cooling chamber of the final heat exchange stage in a secondary final stage wherein said flow is along an absorbent surface opposite said final exchanger impervious surface.

2. The process of claim 1 wherein a portion of the initial heat exchange stage comprises an adiabatic cooling zone.

3. The process of claim 1 wherein said primary flow is contacted with an adsorbent media in said sorbent zone.

4. The process of claim 3 wherein said adsorbent media is periodically regenerated by heating in a regeneration zone.

5. The process of claim 1 wherein said secondary gas flow from said initial heat exchange treatment stage is split into a first stream which is indirectly contacted with said primary flow in a first adsorption zone and a second stream which is heated and contacted with said moisture-bearing adsorbent media.

6. The process of claim 1 wherein the secondary flow from the initial and final stages are directed to adjacent chambers of a heat exchange to condensate liquid from one of said secondary flows.

7. The process of claim 1 wherein the secondary flow from the initial stage is divided into a first portion and a second portion, said first portion being directed to a sorbent zone, a heating zone and to a desorbtion zone adjacent the sorbtion zone.

8. The process of claim 6 wherein said primary flow is subjected to intermediate cooling in one chamber of an intermediate heat exchanger along a moisture-impervious heat exchange element and wherein said second portion of said secondary flow of said final heat exchanger is directed to an adjacent chamber of said intermediate heat exchanger.

9. The process of claim 1 wherein the gas comprises a two-atom gas or a mixture of two-atom gases.

10. A gas cooling system comprising:
   (a) an initial heat exchanger having a housing with a heat exchange element having a first moisture-impervious surface and a second opposite absorbent surface, said heat exchange element extending in said housing and defining therewith a dry pre-cooling chamber adjacent said first surface and a humidification and heating chamber adjacent said second surface;
   (b) air mover means for directing a total gas flow through said first chamber to cool same;
   (c) means for directing a part of said total gas flow exiting said initial dry pre-cooling chamber countercurrently through said heating and humidification chamber of said initial heat exchanger in a secondary gas stream to heat and humidify same and establishing a separate primary gas flow path;
   (d) sorbtion means having a sorbent treatment chamber and a regenerative chamber;
   (e) means for directing said primary gas flow from said initial heat exchanger to said sorbent chamber to heat and dry same;
   (f) a final heat exchanger having a housing with a heat exchange element having a first moisture impervious surface and an opposite second absorbent surface, said heat exchanger element extending in said housing and defining therewith a dry cooling chamber and a heating and humidification chamber adjacent said second surface;

(g) means for introducing the primary gas discharge from said sorbent treatment chamber to said final dry cooling chamber; and
(h) means for directing a part of the gas discharged from said final dry cooling chamber countercurrently through said second heating and humidification chamber of said final heat exchanger.

11. The system of claim 10 wherein each of said initial and final dry cooling chambers has a zone in which adiabatic cooling treatment occurs.

12. The system of claim 10 further including heating means for heating at least a portion of the gas flow from said humidification and heating chamber of said initial heat exchanger and directing the same to said regenerative chamber.

13. The system of claim 10 further including at least one intermediate dry cooling stage interposed in said primary flow path.

14. The system of claim 10 further including condenser means having opposite chambers adapted to receive at least a portion of the secondary flow from said initial and final heat exchangers.

15. The system of claim 10 wherein said heat exchange element is PVC.

16. The system of claim 10 wherein said sorbtion means includes a moisture absorbent material moveable from a regenerative section to an adsorption zone in the path of said primary gas flow.

17. The system of claim 10 further including indirect cooling means in said adsorption zone.

18. A process for treating ambient air to cool the same comprising:
(a) introducing a stream of ambient air into a primary adsorption zone and contacting said primary flow with a regenerative sorbent media to dry the air;
(b) regenerating said regenerative sorbent media in a desorbtion zone by contacting the media with a heated regenerative flow;
(c) directing the primary air from the adsorption zone to a heat exchanger stage along a first moisture impervious heat exchange surface to extract heat at substantially constant moisture conditions to produce a dry cooled air; and
(d) diverting a portion of the dry cooled air to establish a secondary air flow countercurrently to the primary air flow along an absorbent surface adjacent said moisture-impervious surface to transfer heat from said primary flow to said secondary flow.

19. The process of claim 18 wherein said secondary flow is directed to said desorbtion zone.

20. The process of claim 18 wherein a portion of ambient air is directed to said desorbtion zone.

21. The process of claims 16, 17 and 18 wherein said regenerative flow is heated by auxiliary heating means.

* * * * *